Aug. 8, 1961 W. H. MARTY 2,995,045
METHODS OF MAKING POWER TRANSMITTING BELTS AND MEANS
FOR CONNECTING THE ENDS OF SUCH BELTS
Filed Oct. 24, 1958 2 Sheets-Sheet 1
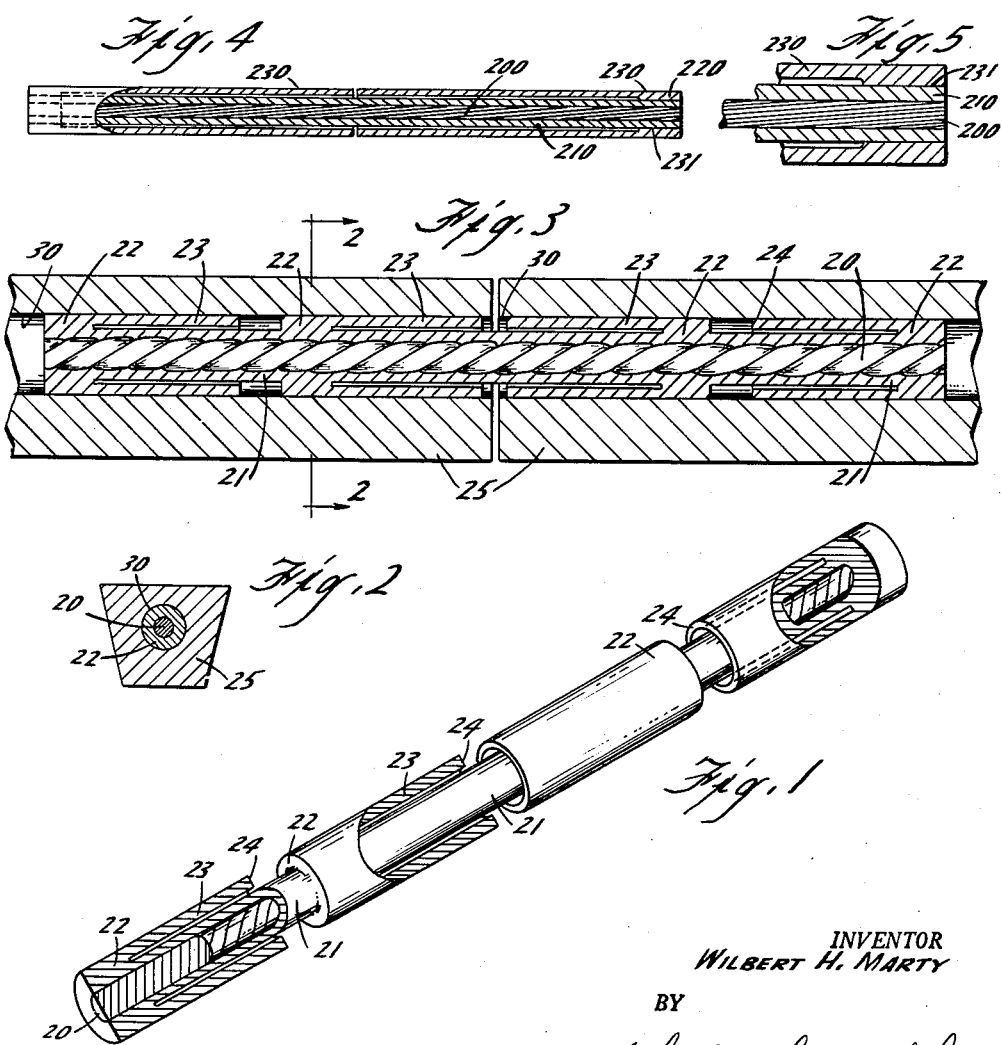
INVENTOR
WILBERT H. MARTY
BY
Wheeler, Wheeler & Wheeler
ATTORNEYS Aug. 8, 1961 W. H. MARTY 2,995,045
METHODS OF MAKING POWER TRANSMITTING BELTS AND MEANS
FOR CONNECTING THE ENDS OF SUCH BELTS
Filed Oct. 24, 1958 2 Sheets-Sheet 2
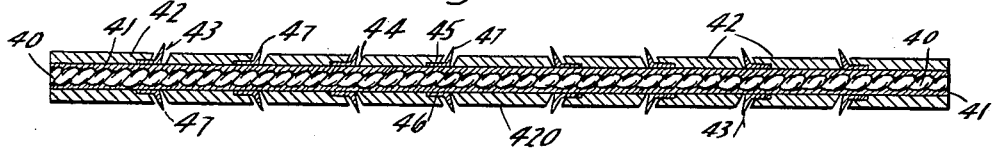
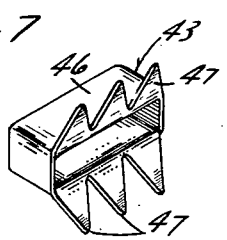
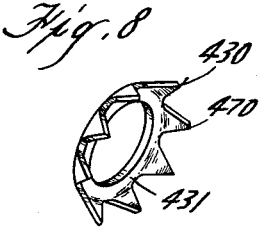
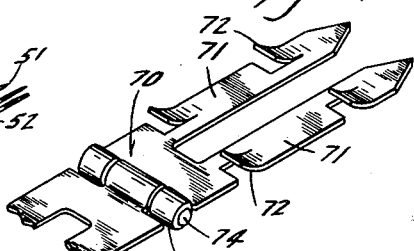
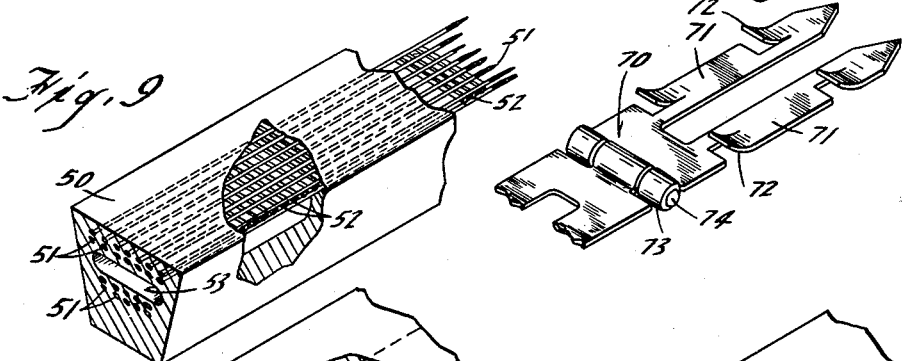
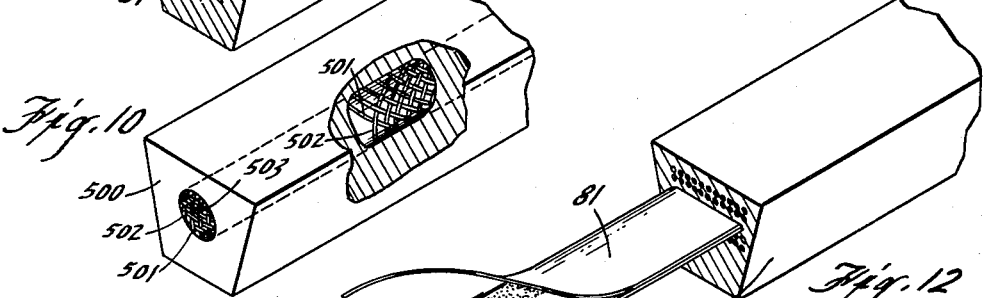
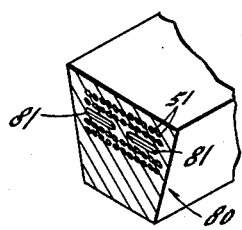
INVENTOR
WILBERT H. MARTY
BY
Wheeler, Wheeler & Wheeler
ATTORNEYS United States Patent Office 2,995,045
Patented Aug. 8, 1961

2,995,045
METHODS OF MAKING POWER TRANSMITTING BELTS AND MEANS FOR CONNECTING THE ENDS OF SUCH BELTS
Wilbert H. Marty, 2354 Commonwealth, Monticello, Wis.
Filed Oct. 24, 1958, Ser. No. 769,493
17 Claims. (Cl. 74—258)

This invention relates to methods of making power transmitting belts and means for connecting the ends of such belts.

The invention is concerned with the problem of making flexible belts, and particularly V-belts, more adaptable by making it possible to cut a piece of belting of the proper length from a continuous strip of such material, thus making it possible to reduce the number of sizes which need be kept in stock, since only the cross section of the belt need be considered in stocking the various sizes. It has a further advantage in that belts may be made up without difficulty for special applications for which there is no stock size.

The invention consists of several forms of connectors, all of which are so constructed that they may be inserted into the opposed ends of a loop of flexible belting to connect them, but firmly resist withdrawal from the belt, so as to bear the longitudinal stresses to which such belts are subjected in service. The invention also consists in belt constructions which enable the belt to accept and retain the connectors.

FIGURE 1 is a perspective view of a connector embodying my invention with portions broken away to show the internal structure.

FIGURE 2 is a cross-sectional view on line 2—2 of FIG. 3.

FIGURE 3 is a longitudinal cross-sectional view of a belt with the connector of FIG. 1 installed in it.

FIGURE 4 is a plan view of a modified form of belt connector which is broken away to a longitudinal cross-sectional view.

FIGURE 5 is an enlarged longitudinal cross-sectional view of the end of FIG. 4.

FIGURE 6 is a longitudinal cross-sectional view of a further modification of my connector.

FIGURE 7 is a perspective view of a holding element used in the embodiment of FIG. 6.

FIGURE 8 is a perspective view of a modified holding element used in the embodiment of FIG. 6.

FIGURE 9 is a perspective view of a belt which is used with the embodiment of FIG. 6 and the holding element of FIG. 7.

FIGURE 10 is a perspective view of a belt which is used with the connector of FIG. 6 and the holding element of FIG. 8.

FIGURE 11 is a perspective view of a modified connector.

FIGURE 12 is a perspective view of the end of a V-belt showing a modified method of forming voids therein for insertion of a connector.

FIGURE 13 is an enlarged view of an end of a modification of the belt of FIG. 12.

Referring to FIG. 1, my connector consists of a steel braided wire core 20 or some other core material of a great strength. It is sheathed in a layer 21 of rubber or a similar material, which is integral to a portion 22 of increased diameter from which a sleeve 23 projects axially. Sleeve 23 is concentric with layer 21, and may be, but need not be spaced slightly therefrom. The sleeve terminates in a free end 24. Several such annular sleeves 23 may be formed at each end of the belt connector, the free end 24 being the closest point of each such sleeve to the center of the connector, so that the sleeves at one end of the connector are opposed to those at the other end of the connector.

Referring now to FIG. 3, a belt 25 is used which is provided with hole 30 in its center, into which the connector of FIG. 1 is inserted. The friction between the sleeve portions 23 of the connector and the belt cause attenuation of the flexible material of the sleeves during insertion, but any force which tends to withdraw the sleeve causes axial compression and radial expansion of the sleeve, thus causing a wedging action which makes it virtually impossible to withdraw the connector. The core 20 provides the stiffness necessary for insertion of the connector, and transmits axial forces during use of the belt.

As many sleeve sections 23 may be provided on each side of the center of the connector as is desired or necessary to provide sufficient axial strength in the joint between the ends of the belt.

The core 20 of the connector is sufficiently rigid to serve as a means of applying force to the end of the connector for inserting it into a belt in an axial direction, but is substantially as flexible laterally as the belt itself so as to have little or no effect on the flexibility of the completed belt.

FIGURE 4 shows a slightly modified connector in which the sleeves 230 are each substantially one half the length of the connector, and having only one such sleeve on each side of the center line. In other respects the connector is substantially the same as the connector of FIG. 1, comprising a portion 220 at the end of sleeve 230 connecting the sleeve to layer 210, which sheaths central core 200 and adheres to it, to provide the necessary bond between the core and the sheath. In FIG. 5, unlike FIG. 3, the outer sleeve 230 and the sheath layer 210 are shown as separate elements bonded at 231, for manufacturing convenience.

In FIG. 6, a modified form of connector is illustrated, consisting of a core 40, a sheathing layer 41, spacer sleeves 42, and barbed elements, which may take either the form illustrated in FIG. 7 or the form illustrated in FIG. 8, depending on whether the core is flat, for insertion into the belt of FIG. 9, or round, for insertion into the belt of FIG. 10. In manufacture, layer 41 is applied to core 40 and bonded thereto, after which spacers 42 and barbed holding elements 43 (FIG. 7) or 430 (FIG. 8) are alternately slipped over the core. Barbed holding elements 43 and 430 are so aligned on the core that the barbs 47 or 470 always incline outwardly from the core toward the center of the connector, a special spacer 420 with identical ends being used at the center.

The remainder of the spacers 42 are provided with one end portion 44 which is beveled to engage the end face of the barb, element 43 or 430, while the other end of the sleeve is provided with an offset 45 to engage sleeve portion 46 of barbed holding element 43. In the case of barbed holding element 430, the spacer sleeve 42 may be a simple square ended tube abutting radial portion 431 of barbed holding element 430. The spacers may be adhesively secured to layer 41, or vulcanized thereto after assembly.

FIG. 9 shows a belt 50 which is adapted to receive the connector of FIG. 6 having barbed holding elements like that of FIG. 7. The belt is provided with alternate layers of axial cords 51 and lateral cords 52 both above and below the center opening 53. Opening 53 is of a form to receive the connector, in this case an elongated oval. In operation, a length of belt 50 is cut from a longer length of such belting, and the ends are joined by pushing the opposite ends of the connector into the opening in the opposite ends of the belt until the two ends of the belt meet at the center line of the connector. The barbs on holding element 43, being inclined toward the center line of the connector, tend to cause the belt material to stretch and ride over the tops of the barbs during insertion of the connector, but when tension is applied to the belt the points of the barbs immediately dig into the material of the belt and are anchored into place by the lateral cords 52, while the axial cords 51 are pushed aside by the entrance of the barb. The axially directed cords not only serve to strengthen the belt but also serve to prevent axial displacement of the lateral cords, due to the adhesive bond between the axial cords, the belt material, and the lateral cords. Axial displacement of the barb is also prevented by the adhesive bond between the spacer sleeves 42 and the layer 41, which is bonded to core 40, core 40 being sufficiently rigid axially to withstand such forces, although it is very flexible laterally in order to maintain the lateral flexibility of the belt.

FIGURE 10 shows a belt 500 similar to the belt 50 of FIG. 9, in which the cords 501 and 502 form oppositely coiled helices about the circular center opening 503. The barbed element 430 of FIG. 8 may be used with this belt, and the barbs 431 are anchored behind the cords upon insertion of the connector, but all of the cords anchor the barbs 431 axially and all of the cords are held against displacement by all of the rest. Cords 501 and 502 may lie at different radial distances from the opening 503, but preferably they are woven into a tube for high resistance to displacement. Other arrangements of the cords are possible but less desirable.

Upon application of tension to the belt, cords 501 and 502 are stretched longitudinally and contract radially, particularly if they are woven or braided into a tube. Consequently, they grip whatever connector is within opening 503. If this structure is used with the connector of FIG. 1 or FIG. 4, opposed radial forces are created between the belt and the connector, further reinforcing the connection between the ends of the belt.

FIG. 11 shows a modification of the connector in which the connector 70 has at least two separate tongues 71 for insertion into a belt, each tongue having barbs 72 which are desirably struck out of its surface. The barbs may be rectangular, as shown or may be triangular sections struck from the edges of the tongues, or other shapes which effectively form barbs to anchor the connector. A hinge 73 having a pin 74 joins the identical halves of the connector.

FIGS. 12 and 13 show a method of producing a belt having one or more passages which are continuous axially, to receive my new connectors. The belt shown has two flat passages, to receive the connector of FIG. 11, or two connectors of the type shown in FIGS. 6 and 7. Belt 80 is formed by molding or extruding the body of the belt around folded strip 81. Strip 81, is provided with one or more lanes 82 of a material such as soapstone which acts as a barrier to adhesion during vulcanization of the belt, interspersed with lanes 83 which are uncoated. The strips 81 may be made of paper, plastic, rubber, fabric, or rubberized fabric. They may themselves act as a barrier to vulcanization, making lanes 82 unnecessary. As shown in FIG. 13, more than one strip 81 may be used, instead of making separate lanes 82 on one strip 81. The strip may also consist of a tube which is corded as in FIG. 10 to provide a circular opening.

In every modification of my invention a connector is provided which is capable of easy insertion in the end of the belt to be joined, but which exerts a wedging action opposing any axial tension that tends to separate the ends of the belt. Also a simple method of manufacture is provided for making belts which are specially adapted to receive my connectors. The connectors of FIG. 11 may be sharpened at the ends and used without previously making a passage in the belt, since the connector will then cut its way into the center of the belt until it is firmly lodged in position.

I claim:

1. The combination comprising a belt for transmitting power having spaced ends, connecting means comprising a laterally flexible axially rigid element, said connecting means being receivable axially into said ends, and holding means on said connecting means adapted to secure said connecting means against axial displacement in a direction to withdraw said connecting means from the ends of said belt said axially rigid element comprising a hinge, said hinge comprising a hinge pin extending laterally across the hinge, and axially extending tongues, said holding means comprising axially slanted barbs, said barbs being attached to said tongues at their bases and being slanted outwardly and toward said hinge pin.

2. The device of claim 1 in which each side of the hinge is divided into a plurality of axially extending tongues, each tongue being provided with barbs.

3. A power transmitting belt having spaced ends apertured axially to receive a connector, and a connector comprising separable rigid barbed sections flexibly assembled in axial series, and means securing said series of sections against axial movement with respect to each other.

4. The device of claim 3 in which said series of barbed sections comprise hinge leaves, said means comprising a hinge pin adapted to releasably connect said sections.

5. The device of claim 3 in which said series of barbed sections are assembled on an axially rigid, laterally flexible core.

6. The device of claim 5 in which said core comprises a metal cable sheathed in a resilient material.

7. The device of claim 6 in which said separable barbed sections comprise annuli spaced along the length of said connecting element, each said annulus being provided with outwardly extending axially slanted barbs, the slant of the barbs being toward the center of the connecting element.

8. The device of claim 7, said means comprising spacer sleeves between each pair of annuli, the ends of each said spacer sleeve having faces complementary to a portion of the annulus which it abuts, said spacer sleeves being bonded to the resilient material about each axially rigid element.

9. The device of claim 7 in which said axially rigid element and said annuli are rectangular in lateral cross section.

10. The device of claim 7 in which said axially rigid element, and said annuli are circular in lateral cross section.

11. The combination comprising a power transmitting belt having a longitudinally extending aperture at least at the ends thereof, said belt being provided with a tubular structure of strengthening cords wound helically about said aperture concentric therewith, and connecting means for joining said ends receivable axially into said ends comprising separable rigid barbed sections having a lateral cross-sectional shape corresponding to the lateral cross-sectional shape of said aperture, said sections being flexibly assembled in axial series, whereby when said connector is inserted in the apertures at the respective ends of said belt, said barbs enter the material of said belt between said cords to securely join said ends.

12. The device of claim 11 in which said cords comprise a clock-wise and a counter clock-wise helix concentric with said apertures.

13. The device of claim 12 in which said clock-wise and said counter clock-wise helices are woven together in a tubular mesh.

14. The device of claim 13 in which the cross-sectional shape of said apertures and said barbed sections is circular.

15. The device of claim 13 in which the cross-sectional shape of said apertures and said barbed sections is flat.

16. The sub-combination comprising a power transmitting belt having free ends to be joined and having a longitudinal aperture at least at each end thereof, and a reinforcing cord wound helically and concentrically with respect to each said aperture.

17. The device of claim 16 in which a plurality of said cords form a woven tubular mesh structure coaxial with said apertures.

References Cited in the file of this patent

UNITED STATES PATENTS

| | | |
|---|---|---|
| 217,692 | Kator | July 22, 1879 |
| 1,198,168 | Thaison | Sept. 12, 1916 |
| 1,378,507 | Wiegand | May 17, 1921 |
| 1,743,492 | Sipe | Jan. 14, 1930 |
| 2,230,392 | Storms | Feb. 4, 1941 |
| 2,300,706 | Schott | Nov. 3, 1942 |